(12) United States Patent
Sigl et al.

(10) Patent No.: US 6,193,548 B1
(45) Date of Patent: Feb. 27, 2001

(54) CONNECTOR FOR A POWER SUPPLY

(75) Inventors: Dennis R. Sigl; Richard W. Beeson; Michael A. Sammons, all of Appleton; Leonid B. Soroka, Whitefish Bay, all of WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/218,064

(22) Filed: Dec. 21, 1998

Related U.S. Application Data

(63) Continuation of application No. 08/780,992, filed on Jan. 9, 1997, now Pat. No. 5,902,150.

(51) Int. Cl.$^7$ .................................................. H01R 13/40
(52) U.S. Cl. .......................................................... 439/550
(58) Field of Search .................................... 439/587, 589, 439/519, 524, 550

(56) References Cited

U.S. PATENT DOCUMENTS 5,431,583 * 7/1995 Szegda .................................. 439/589

* cited by examiner

*Primary Examiner*—Neil Abrams
*Assistant Examiner*—Javaid Nasri
(74) *Attorney, Agent, or Firm*—George R. Corrigan

(57) ABSTRACT

A power supply connector includes a cable receptacle, a front bulkhead insulator and a rear bulkhead insulator. The bulkhead insulators are mounted on the cable receptacle and the power supply chassis. At least one O ring is disposed between the front and rear bulkhead insulators, to seal out water. The front bulkhead insulator includes a stepped portion that mates with a stepped portion on the rear bulkhead insulator. The front bulkhead insulator provides an elongated path from the chassis to the cable receptacle. Also, an O ring is disposed between the cable receptacle and the front bulkhead insulator, to seal out water.

5 Claims, 3 Drawing Sheets

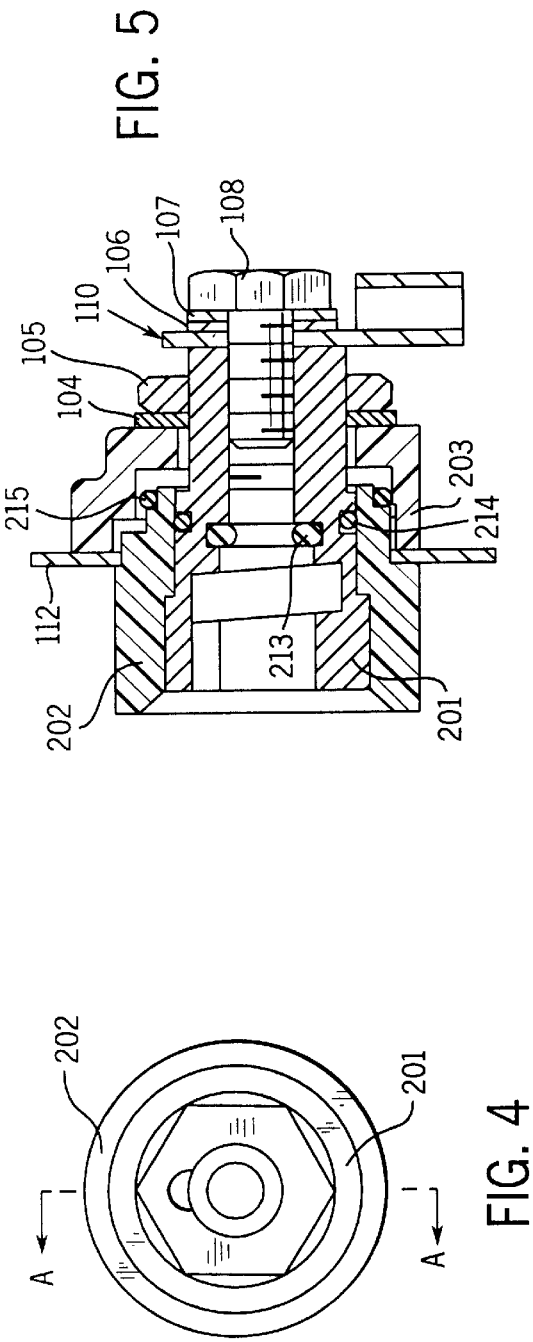
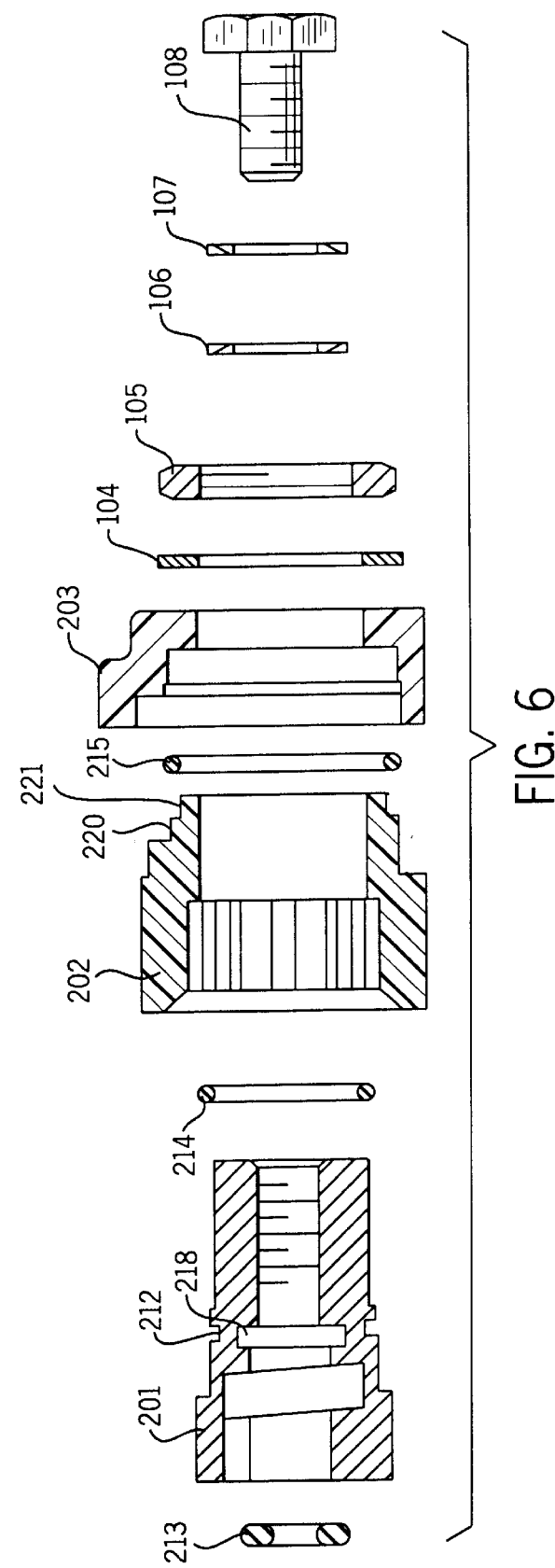

CONNECTOR FOR A POWER SUPPLY

This is a continuation of application Ser. No. 08/780,992 filed on Jan. 9, 1997, now U.S. Pat. No. 5,902,150.

FIELD OF THE INVENTION

This invention relates generally to a connector for a power supply such as a welding power supply and, in particular, to a connector that reduces the likelihood of shorting out or breaking over or arcing from the internal or external electrical connection (which may be electrically hot) to the power supply chassis.

BACKGROUND OF THE INVENTION

Power supplies such as welding power supplies are used to provide high amperage current. Typically, in a welding power supply, a pair of output terminals is provided. A welding cable connected to the welding torch (or stinger, drive assembly or welding circuit) is inserted into one of the two output terminals. The other output terminal receives a welding cable which is connected to the workpiece being welded. Typically, the connectors are twist lock type connectors (also called international connectors), the power supply has a female connector, and the welding cable has a mating male connector. In some designs the cable has a female connector and the power supply a male connector.

One prior art twist lock connector is shown in FIGS. 1-3. The prior art connector, as shown in FIG. 3, includes a twist lock receptacle 101, a front bulkhead insulator 102, a rear bulkhead insulator 103, a lock washer 104, a nut 105, a washer 106, a lock washer 107 and a hex bolt 108. Hex bolt 108 and washers 104, 106 and 107 are comprised of zinc plated steel, and twist lock connector 101 and nut 105 are comprised of brass. The front and rear bulkhead insulators, 102 and 103 are phenolic. The steel and brass components are used to provide for adequate electrical contact. A phenolic is typically used because it is a good insulator, flame-retardant, and will not melt.

Referring now to FIG. 1, a view of the prior art connector from outside the power supply is provided. Front bulkhead insulator 102 includes a ridge, as depicted by the concentric circles of FIG. 1. The inner perimeter of front bulkhead insulator 102 is hexagonal in shape. A twist lock receptacle 101 has a hexagonal outer perimeter and fits tightly within front bulkhead insulator 102. Twist lock receptacle 101 includes a circular opening 116 having an axial notch 115. A circumferential, slightly helical, notch 117, within twist lock receptacle 101, may be seen in FIGS. 2 and 3. When the welding cable is connected, a key on the male connector attached to the welding cable mates with notch 115, and when the cable connector has been inserted all of the way, the cable connector is rotated and the key turns in circumferential notch 117. The male connector is pulled tightly to the face of the female connector by the action of the helical-shaped notch. Thus, the cable connector is locked into place and the desired electrical contact is obtained.

Referring now to FIG. 2, front bulkhead insulator 102 is inserted into a hole in a power supply chassis 112. The hole in power supply chassis 112 includes a notch which receives a key 119 on front bulkhead insulator 102. Thus, front bulkhead insulator 102 does not twist when the male connector on the welding cable is being rotated to lock it into place.

An end 120 of twist lock receptacle 101 extends within the welding power supply and rear bulkhead insulator 103 is mounted thereon. Rear bulkhead insulator 103 and front bulkhead insulator 102 are designed to mate and welding power supply chassis 112 is sandwiched between them. Also, the notch on front bulkhead insulator 102 is received in a similarly and oppositely notched portion 122 of rear bulkhead insulator 103, to prevent the inner portion of the connector from rotating.

Inner end 120 of twist lock receptacle 101 is threaded and nut 105 has mating threads to allow nut 105 to be threadedly mounted on twist lock receptacle 101. Thus, nut 105 and lock washer 104 are used to maintain contact between front bulkhead insulator 102, welding power supply chassis 112 and rear bulkhead insulator 103.

End 120 of twist lock receptacle 101 is hollow, and its inner surface is threaded. The threaded interior portion receives hex bolt 108, about which washer 106 and lock washer 107 are disposed. As shown in FIG. 2, an internal electrical connection 110 is placed between the inner end of twist lock receptacle 101 and washer 106. The internal electrical connection 110 may be a copper lug, an aluminum bus bar, or any other internal electrical connection. Some prior art connectors include a gas fitting that replaces hex bolt 108, and an O ring disposed within twist lock receptacle 101 near notch 117 that seals the gas flow path (through the connector and into the cable).

Thus, it may be seen that the prior art connectors provided for a secure and locking electrical connection between an internal electrical connection and the welding cable.

It is not unusual for welding power supplies to be used outside, for example at construction sites. Thus, they are often exposed to rain or may otherwise get wet. Also, to obtain IEC certification.(or other certifications such as UL, CSA, NEMA etc.), welding power supplies must be subjected to a "rain test". In such a test, the power supply will be subjected to water, to ensure that premature failures in the field will not occur.

However, in the prior art connectors water sometimes seeps between front bulkhead insulator 102 and welding chassis 112. The water then seeps down between front bulkhead insulator 102 and rear bulkhead insulator 103. The potential water leakage path is labelled 118, and is shown as a solid black line. As water leaks in along path 118, it may provide a conductive path from twist lock receptacle 101, which is electrically hot, to chassis 112, which should be grounded. Thus, this path may provide an undesirable short.

It is typical to provide a welding power supply with a high frequency arc starter. A high frequency arc starter provides a low current, but high voltage, high frequency signal. Such a high voltage signal can arc along path 118 from twist lock receptacle 101 to welding power supply chassis 112. This problem is exacerbated when water seeps into path 118.

One prior art attempt to solve the problems of water leakage and high frequency arcing is to apply a RTV (room temperature vulcanizing) compound in an attempt to seal path 118. However, such a compound is difficult to apply and does not adequately solve the problem. Additionally, a second potential water seepage path 118A may be found between twist lock receptacle 101 and front bulkhead insulator 102.

Accordingly, it is desirable to provide a power supply connector that will reduce the likelihood of water leaking into the power supply and causing a short therein, or to have a short during high frequency arc starting. Such a connector should preferably be a locking cable receptacle, with an anti-rotational fitting and relatively simple and easy to manufacture.

SUMMARY OF THE PRESENT INVENTION

One aspect of the invention is a power supply connector that includes a cable receptacle. A front bulkhead insulator and a rear bulkhead insulator are mounted on the cable receptacle. At least one O ring is disposed between the front and rear bulkhead insulators, to seal out water. In alternative embodiments the front bulkhead insulator includes a stepped portion that mates with a stepped portion on the rear bulkhead insulator. The front bulkhead insulator may provide for an elongated path from the chassis to the cable receptacle. Also, an O ring may be disposed between the cable receptacle and the front bulkhead insulator, to seal out water. The connector may be a twist lock connector, and the chassis may be placed between the bulkhead insulators.

Another aspect of the invention is a power supply connector including a cable receptacle. A front bulkhead insulator mounts on the cable receptacle, and on the welding power supply chassis. A rear bulkhead insulator is also mounted on the cable receptacle and the welding power supply chassis. The front bulkhead insulator includes a stepped portion and the rear bulkhead insulator includes a stepped portion and the bulkhead insulators mate with one another. In alternative embodiments of this aspect of the invention the front bulkhead insulator provides for an elongated path from the chassis to the cable receptacle. Alternatively, an o ring may be disposed between the cable receptacle and the front bulkhead insulator. The connector may be a twist lock connector, and the chassis may be placed between the bulkhead insulators.

A third aspect of the invention is a power supply connector that also includes a cable receptacle and a front bulkhead insulator mounted about the cable receptacle and on a welding power supply chassis. A rear bulkhead insulator is also mounted about the cable receptacle and on the welding power supply chassis. The front bulkhead insulator is shaped to provide an elongated path from the chassis to the cable receptacle. Alternatives to this embodiment include an O ring disposed between the cable receptacle and the front bulkhead insulator. Also, the cable receptacle may be a twist lock receptacle, and the chassis may be sandwiched between the bulkhead insulators.

A fourth aspect of the invention is a power supply connector that also includes a cable receptacle and a front bulkhead insulator mounted about the cable receptacle and on a welding power supply chassis. A rear bulkhead insulator is also mounted about the cable receptacle and on the welding power supply chassis. An O ring disposed between the cable receptacle and the front bulkhead insulator. In an alternative embodiment the cable receptacle may be a twist lock receptacle, and the chassis may be sandwiched between the bulkhead insulators.

Other principal features and advantages of the invention will become apparent to those skilled in the art upon review of the following drawings, the detailed description and the appended claims.

BRIEF DESCRIPTION OF THE DRAWINGS

FIG. 4 is a front view of a connector constructed in accordance with the present invention;

FIG. 5 is a cross-sectional view of the connector of FIG. 4, taken along Line A—A;

FIG. 6 is an expanded view of the connector of FIG. 4, taken along Line A—A;

Figure 1:
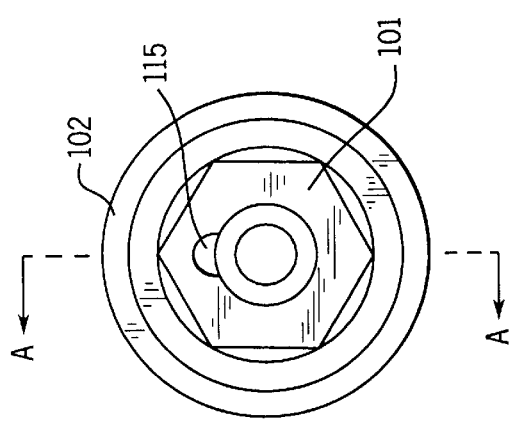
FIG. 1 is a front view of a connector of a prior art connector.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to two particular welding power supply connectors, it should be understood at the outset that the invention can also be employed for other power supply connectors, including connectors comprised of a different material, or connectors of other designs, or male connectors.

One embodiment of the invention is shown in FIGS. 4–6. An expanded cross-sectional view of an inventive connector is shown in FIG. 6 to include an O ring 213, a twist lock receptacle 201, an O ring 214, a front bulkhead insulator 202, an O ring 215, a rear bulkhead insulator 203, lock washer 104, nut 105, washer 106, lock washer 107, and hex bolt 108. In the preferred embodiment, twist lock receptacle 201 and nut 105 are comprised of brass. Lock washer 104, washer 106, lock washer 107 and hex bolt 108 are comprised of steel, and preferably zinc-plated. These materials are brass and/or steel with zinc-plating to provide for adequate electrical connection between the internal electrical connection (110 of FIG. 5) and the welding cable (brass) and to provide mechanical stability (steel). Front bulkhead insulator 202 and rear bulkhead insulator 203 are preferably comprised of a phenolic because it is a good insulator, it does not-melt easily, and it is flame-retardant. O rings 213, 214, and 215 are preferably comprised of silicone rubber which adequately seals the parts between which they are disposed.

Figure 2:
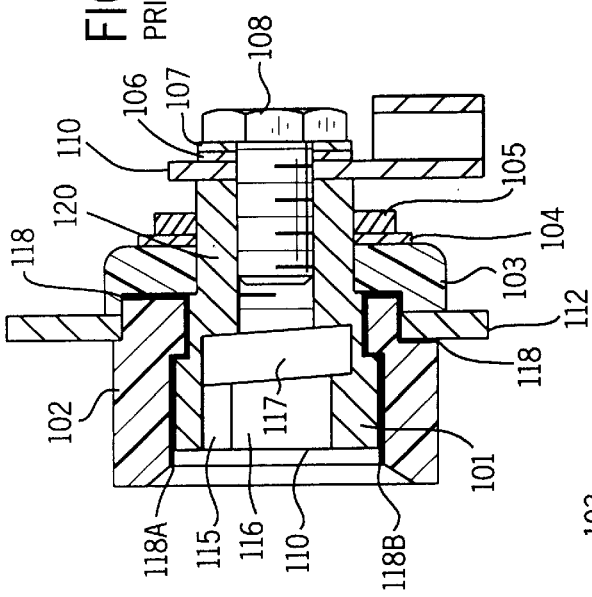
FIG. 2 is a cross-section taken along Line A—A of FIG. 1.
Figure 3:
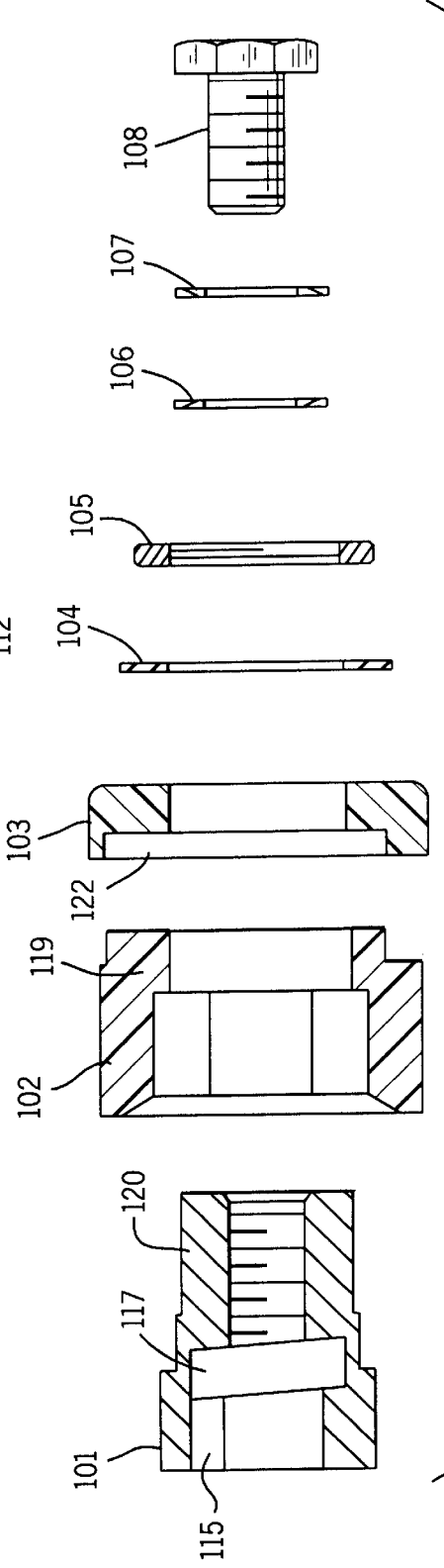
FIG. 3 is an expanded view of a cross-section taken along Line A—A of FIG. 1.

Referring now to FIG. 4, a front view of the inventive connector is shown. It may be seen that from the front, the connector looks much like the prior art connector of FIGS. 1–3. For example, the connector is designed to receive the same male welding cable connector the prior art received, and thus includes circumferential, slightly helical, and axial notches (FIG. 5) just like the prior art's.

Referring further to FIG. 5, an assembled connector is shown mounted about chassis 112 and attached to internal electrical connection 110. As with the prior art design, twist lock receptacle 201 is disposed within front bulkhead insulator 202. However, an O ring 214 is placed around a circumferential notch 212 (FIG. 6) on twist lock receptacle 201. O ring 214 thus seals the potential water leakage path between twist lock receptacle 201 and front bulkhead insulator 202. This also provides a barrier to keep an HF signal from shorting to the chassis.

Also, a circumferential notch 218 is provided to receive a gas O ring 213. Gas O ring 213 is provided so that when a gas connection (often used in various welding processes), is used, the gas will be adequately sealed and will not leak outside the welding cable.

Front bulkhead insulator 202 is provided with a stepped portion 220 which is received by a similarly stepped portion of rear bulkhead insulator 203. Stepped portion, as used herein, means that the surface has at least three segments, wherein the segments are separated by a change in direction (i.e., an angle or a bend in the surface). In the preferred embodiment the segments are defined by ninety degree angles, although other angles may be used.

O Ring 215 is seated on a notch 221 of front bulkhead insulator 202. When assembled, as shown in FIG. 5, rear bulkhead insulator 203 mounts on twist lock receptacle 201 and front bulkhead insulator 202. Welding power supply chassis 112 is disposed there-between, and has a notch (as did the prior art) to prevent rotation of the connector when the welding cable is connected thereto. Lock washer 104, nut 105, washer 106, lock washer 107 and hex bolt 108 are used in the same manner as they were used in the prior art.

It may be seen that water leakage path 118 of the prior art is sealed by O ring 215 in this inventive design. Also, stepped portion 220 lengthens the path from chassis 112 to twist lock receptacle 201. Thus, for an arc to occur it must traverse an elongated path and a seal. As used herein, elongated path means a path having a greater distance than a straight line (or close to the same as distance as a straight line). In the preferred embodiment the elongated path is obtained using a stepped portion. However, in an alternative the stepped portion is omitted, and the elongated path is obtained by increasing the length of front bulkhead insulator 202. Both the seal and the elongated path help greatly reduce the likelihood of arcing during HF arc starting or even after the power supply has been subjected to an IEC "rain test." Also, O ring 214 prevents water from leaking in between twist lock receptacle 201 and front bulkhead insulator 202.

Figure 8:
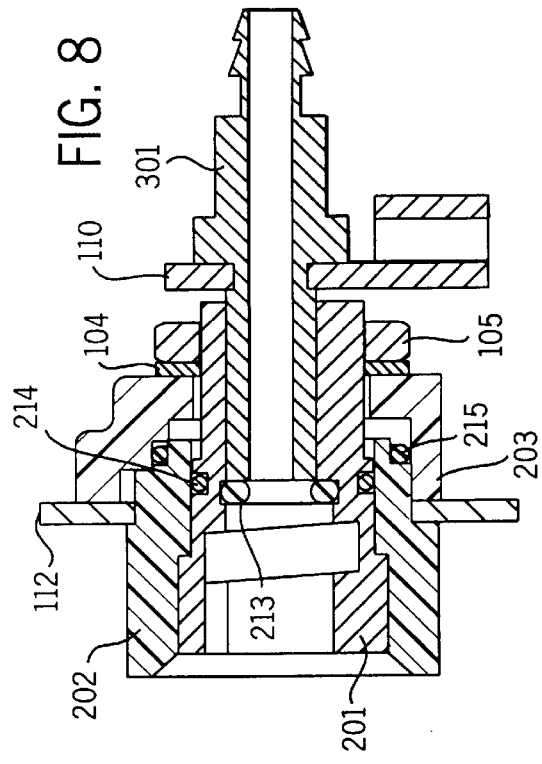
FIG. 8 is a cross-section of the connector of FIG. 7, taken along Line A—A.
Figure 7:
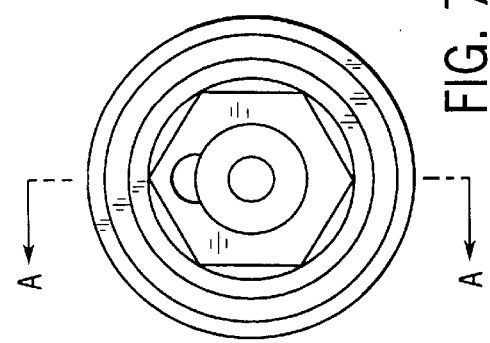
FIG. 7 is a front view of a connector suitable for receiving a gas fitting, constructed in accordance with the present invention.
Figure 9:
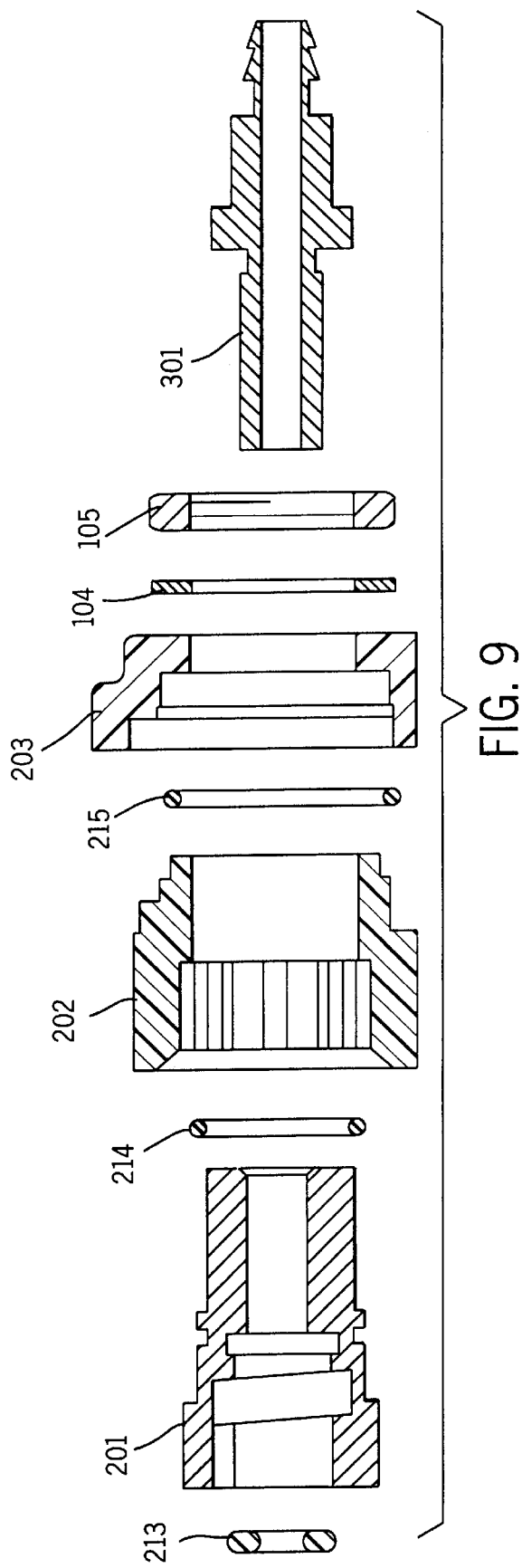
FIG. 9 is an expanded cross-section of the connector of FIG. 7, taken along Line A—A.

FIGS. 7–9 show a second embodiment of the inventive welding power supply connector. As may be seen in FIGS. 8 and 9, the connector is substantially identical to the connector of FIGS. 4–6, but hex bolt 108 is replaced with a gas fitting 301. Gas fitting 301 is used to provide gas from an internal gas supply through the inner portion of twist lock receptacle 201 to the welding cable.

Numerous modifications may be made to the present invention which still fall within the intended scope hereof. Thus, it should be apparent that there has been provided in accordance with the present invention an apparatus for connecting a cable to a power supply that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A power supply connector comprising:
    a cable receptacle, which forms part of a current carrying path through the connector;
    a bulkhead insulator mounted about the cable receptacle and on a welding power supply chassis, which is not part of the current carrying path; and
    an O ring disposed between the cable receptacle and the bulkhead insulator.

2. The connector of claim 1 wherein the cable receptacle is a twist lock receptacle.

3. The connector of claim 1 wherein the bulkhead insulator includes a stepped portion.

4. The connector of claim 3 wherein the bulkhead insulator provides for an elongated path from the chassis to the cable receptacle.

5. The connector of claim 1 wherein the bulkhead insulator provides for an elongated path from the chassis to the cable receptacle.

* * * * *